(12) United States Patent
Zhao et al.

(10) Patent No.: US 9,930,330 B2
(45) Date of Patent: Mar. 27, 2018

(54) METHOD AND APPARATUS FOR CODED BLOCK FLAG CODING IN HIGH EFFICIENCY VIDEO CODING

(71) Applicant: HFI INNOVATION INC., Zhubei, Hsinchu County (TW)

(72) Inventors: Liang Zhao, Harbin (CN); Jicheng An, Beijing (CN); Xin Zhao, Beijing (CN); Xun Guo, Beijing (CN)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 315 days.

(21) Appl. No.: 14/372,696

(22) PCT Filed: Jan. 7, 2013

(86) PCT No.: PCT/CN2013/070160
§ 371 (c)(1),
(2) Date: Jul. 16, 2014

(87) PCT Pub. No.: WO2013/107309
PCT Pub. Date: Jul. 25, 2013

(65) Prior Publication Data
US 2015/0030067 A1    Jan. 29, 2015

(30) Foreign Application Priority Data

Jan. 19, 2012 (WO) ................ PCT/CN2012/070612

(51) Int. Cl.
*H04N 19/186* (2014.01)
*H04N 19/176* (2014.01)
(Continued)

(52) U.S. Cl.
CPC ..... *H04N 19/00315* (2013.01); *H04N 19/132* (2014.11); *H04N 19/176* (2014.11);
(Continued)

(58) Field of Classification Search
CPC .............. G02B 5/201; H01L 27/14621; H01L 27/14625; H04N 9/045; H04N 9/07
(Continued)

(56) References Cited

U.S. PATENT DOCUMENTS

2009/0060049 A1    3/2009  Chuang
2010/0040148 A1*   2/2010  Marpe ................ H04N 19/176
                                                              375/240.16
(Continued)

FOREIGN PATENT DOCUMENTS

CN    102172025    8/2011
CN    102484716    5/2012
(Continued)

OTHER PUBLICATIONS

Bross, B., et al.; "WD5 Working Draft 5 of High-efficiency Video Coding;" Joint Collaborative Team on Video Coding (JCT-VC) of ITU-T SG16 WP3 and ISO/IEC JTC1/SC29/WG11; Nov. 2011; pp. 1-7.

*Primary Examiner* — Jared Walker
(74) *Attorney, Agent, or Firm* — McClure, Qualey & Rodack, LLP

(57) ABSTRACT

A method and an apparatus for decoding of a video bitstream are disclosed. In one embodiment, the method comprises: decoding a first coded block flag (cbf) of the color component indicating whether a current coding unit (CU) of the color component has at least one non-zero transform coefficient (830). According to the first cbf of the color component, the method further comprises decoding four second cbfs, each indicating whether one of four sub-blocks in the current CU of the color component has at least one non-zero transform coefficient (850). The residual quad-tree (RQT) of the current CU of the color component is determined based on the first cbf of the color component (870), or based on the first cbf and the second cbfs of the color component if the
(Continued)

second cbfs exist (860). In another embodiment, the method comprises decoding a cbf associated with a transform unit (TU) and determining RQT of the TU based on the cbf, wherein said determining the RQT of the TU based on the cbf is the same for a luma component and a chroma component and the cbf is recovered from the video bitstream.

20 Claims, 8 Drawing Sheets

(51) Int. Cl.
 *H04N 19/46* (2014.01)
 *H04N 19/96* (2014.01)
 *H04N 19/132* (2014.01)
 *H04N 19/60* (2014.01)

(52) U.S. Cl.
 CPC ........... *H04N 19/186* (2014.11); *H04N 19/46* (2014.11); *H04N 19/60* (2014.11); *H04N 19/96* (2014.11)

(58) Field of Classification Search
 USPC ..................................................... 375/240.02
 See application file for complete search history.

(56) References Cited

U.S. PATENT DOCUMENTS

| | | | |
|---|---|---|---|
| 2011/0038412 A1* | 2/2011 | Jung | H04N 19/146 375/240.12 |
| 2011/0170012 A1* | 7/2011 | Cheon | H04N 19/46 348/725 |
| 2011/0249721 A1 | 10/2011 | Karczewicz et al. | |
| 2011/0249754 A1 | 10/2011 | Karczewicz et al. | |
| 2012/0183080 A1* | 7/2012 | Zhou | H04N 19/61 375/240.26 |
| 2012/0189052 A1* | 7/2012 | Karczewicz | H04N 19/176 375/240.12 |
| 2012/0230421 A1* | 9/2012 | Chen | H04N 19/176 375/240.18 |
| 2012/0328209 A1* | 12/2012 | Sasai | H04N 19/139 382/239 |
| 2015/0139337 A1 | 5/2015 | Chen et al. | |

FOREIGN PATENT DOCUMENTS

| | | |
|---|---|---|
| CN | 103098463 | 5/2013 |
| WO | WO 2010/039733 | 4/2010 |
| WO | 2011121715 A1 | 10/2011 |

\* cited by examiner

METHOD AND APPARATUS FOR CODED BLOCK FLAG CODING IN HIGH EFFICIENCY VIDEO CODING

CROSS REFERENCE TO RELATED APPLICATIONS

The present invention claims priority to PCT Patent Application, Serial No. PCT/CN2012/070612, filed Jan. 19, 2012, entitled "Methods and Apparatuses of CBF Coding in HEVC". The PCT Patent Application is hereby incorporated by reference in its entirety.

TECHNICAL FIELD

The present invention relates to video coding. In particular, the present invention relates to method and apparatus for coding the cbf (coded block flag) syntax associated with coding unit (CU) and transform unit (TU) in High Efficiency Video Coding (HEVC).

BACKGROUND

HEVC (High Efficiency Video Coding) is an advanced video coding system being developed under the Joint Collaborative Team on Video Coding (JCT-VC) group of video coding experts from ITU-T Study Group. In HEVC Test Model Version 5.0 (HM-5.0), the inter-coded and intra-coded residues are coded using block-based transform coding. The blocks (called transform units) are partitioned from a root block (a root transform unit) using a quad-tree structure. The quad-tree partition is applied iteratively until a leaf block or a smallest block is reached. Two-dimensional transform is then applied to each of the transform units. Each TU can be split into four sub-TUs, i.e. leaf TUs. For each TU, a syntax element named cbf (coded block flag) is transmitted to indicate if the TU has non-zero transformed coefficients or not, where a "1" indicates at least one existing non-zero coefficient and a "0" indicates no non-zero coefficient.

In HM-5.0, the cbf is signaled only for leaf TUs of the residual quad-tree for the luma component. For the chroma components, the cbf is signaled for both the root TU and the leaf TU, however, the cbf is only signaled in a TU that is smaller than or equal to the maximum chroma TU size. FIG. 1 to FIG. 3 illustrate examples of the cbf signaling. In FIG. 1, block 110 shows the residual quad-tree splitting of a TU, where a root TU is partitioned into sub-TUs (TU 0 through TU 6) using quad-tree partition. Block 120 shows the corresponding cbf bits, where TUs 1, 3, 5 and 6 have non-zero coefficient and TUs 0, 2 and 4 have no non-zero coefficient. If the TU is a luma TU, the cbf bits are transmitted only for leaf TUs. An example of cbf signaling (i.e., cbf coding) for a luma TU is illustrated in FIG. 2A, where four sets of bins "0", "1" "0101" and "1" correspond to the cbf bits for the four leaves of root TU 210. The cbf bits are signaled in a raster-scan order, i.e., in the order of upper left TU, upper right TU, lower left TU and lower right TU. For the lower left leaf TU, the TU is further partitioned into four leaf TUs. The cbf bits for this leaf TU are "0101" in the raster-scan order. Accordingly, the four sets of cbf bits 220 are shown in FIG. 2A. An example of cbf signaling for a chroma TU is illustrated in FIG. 2B, where the cbf bits are transmitted for both the root TU and the leaf TU. The root TU 230 is partitioned into four leaf TUs and the lower left leaf TU is further partition into four leaf TUs. Therefore, there are three levels of cbf bits corresponding to the three levels of TUs. For the root TU (i.e., depth=0), cbf bit "1" (indicated by reference number 240) is signaled. For the four leaf TUs of the root TU, the cbf bits are "0", "1", "1" and "1" (indicated by reference number 250) in the raster-scan order. For the lower left leaf TU, the TU is further partitioned into four leaf TUs with corresponding cbf bits "0", "1" "0" and "1" (indicated by reference number 260) in the raster-scan order. As shown in FIG. 2A and FIG. 2B, while the luma TU and chroma TU have the same RQT (residual quad-tree) structure, the cbf signaling is different. The example in FIG. 2B is for root block smaller than or equal to the maximum chroma TU size. For example, given maximum chroma TU size is 16×16 and minimum chroma TU size is 4×4, the size of the root TU 230 is 16×16, and the size of each lower left leaf TU is 4×4. When the chroma leaf CU size is larger than the maximum chroma TU size, such as 32×32, there is no cbf signaled in the 32×32 level.

In order to reduce the number of cbf bits, an inferring method is used for luma and chroma TUs, where the cbf flag of the fourth leaf TU of a root TU is inferred by using the cbf flags of other TUs. Therefore, the cbf of the fourth leaf TU does not need to be transmitted.

For luma TUs, the cbf of the fourth leaf TU can be inferred from the coded block flags (cbfs) of previous three leaf TUs and the cbf of the associated root TU. Block 310 in FIG. 3 illustrates an example when the cbf of the fourth leaf TU can be inferred. The lower left TU indicated by thick-lined box 312 is partitioned into four leaf TUs, where the cbf of the fourth leaf TU is 1. Since TU 312 is partitioned into four leaf TUs, there is at least one non-zero coefficient among the four leaf TUs. When cbfs of the three previous leaf TUs are all zero (in the raster-scan order), the cbf of the last leaf TU (i.e., the fourth leaf TU) must be 1. Therefore, the cbf for the fourth leaf TU in this case can be inferred. The cbf of a leaf TU is also referred to as a leaf cbf for convenience.

For chroma TUs, the situation is different because cbf is transmitted for all level of the residual quad-tree. For the four leaf TUs associated with each root TU, the cbf for the root TU is transmitted. If the cbf of the TU is 1 (block 312 in FIG. 3), there must be at least one non-zero leaf TU among the four leaf TUs. Therefore, if the cbfs of the first three leaf TUs are all zero, the cbf of the last TU (indicated by a circle) must be 1. In this case, the last cbf can be inferred and does not need to be signaled. Moreover, the inferring mechanism can be applied to both intra and inter coded TU for the chroma component.

In HEVC, there is also a root residual flag for an inter-coded coding unit (CU). When residual flag is false, there is no need to signal all the cbfs for Y, U and V components. When the residual flag is true and TU depth of current CU is 0, the luma cbf can be inferred to be 1 if chroma cbfs are all 0. Therefore, if the cbfs for U (block 320) and V (block 330) are all 0, the cbf for the luma TU at depth 0 is inferred to be 1 as shown in FIG. 3.

In HM5.0, the maximum TU size is 16×16 for the chroma component and 32×32 for the luma component. However, the maximum CU size is 32×32 for the chroma component. Therefore, the maximum CU size and TU size are not the same. Furthermore, in HM-5.0, the chroma cbf is signaled for the TU with a size smaller or equal to the maximum TU size. For example, when the CU size is 64×64, i.e. chroma CU size is 32×32, the maximum TU size corresponds to 16×16. Therefore, four root cbfs will be transmitted for the four 16×16 chroma TUs of this 32×32 CU. In this case, even when the four cbfs are all 0, the cbfs will be transmitted, as illustrated in FIG. 4, where the size of the chroma CU 410 is 32×32.

As mentioned above, the cbf signaling method is different for the luma TU and chroma TU. It is desirable to use a unified cbf signaling method to simplify the process. In addition, the existing cbf signaling method has some redundancy and it is desirable to further improve the efficiency of the existing cbf signaling method.

SUMMARY

A method and apparatus for encoding and decoding of a video bitstream are disclosed. In one embodiment, the method comprises decoding a first cbf (coded block flag) of a color component indicating whether a current CU (coding unit) of the color component has any non-zero transform coefficient, wherein the first cbf is recovered from the video bitstream. According to the decoding result of the first cbf, the method further comprises decoding four second cbfs of the color component, each indicating whether one of four sub-blocks in the current CU of the color component has any non-zero transform coefficient, wherein the second cbfs of the color component are recovered from the video bitstream. The residual quad-tree structure of the current CU of the color component is then determined based on the first cbf of the color component, or based on the first cbf and the second cbfs of the color component if the second cbfs exist. In the above method, the current CU of the color component has a size greater than the maximum TU size of the color component. The maximum TU size is 32×32 for the luma component and the maximum TU size is 16×16 for the chroma component. The maximum TU size of the color component can be signaled in a sequence level.

In another embodiment, the method comprises decoding a cbf (coded block flag) associated with a TU and determining RQT (residual quad-tree) of the TU based on the cbf, wherein signaling of the cbf is the same for a luma component and a chroma component and the cbf is recovered from the video bitstream. The cbf can be signaled at a root TU and leaf TUs or the cbf can be signaled at leaf TUs only. The cbf can also be signaled at a root level of a CU regardless of whether block size of the CU is larger than a maximum TU size. The cbf can be coded using CABAC (context-based adaptive binary arithmetic coding), wherein context model for the CABAC depends on depth of the RQT. The cbf may also be determined using inferring in some cases.

DETAILED DESCRIPTION

In one embodiment of the present invention, luma and chroma cbf signaling methods are unified by extending the chroma cbf coding method to the luma cbf. Therefore, the luma and chroma cbfs are both signaled for each level of the residual quad tree. In other words, cbf signaling is performed for both the root TU and the leaf TU. Inferring methods for the luma and chroma components are also unified in this case. Accordingly, the luma TU uses the same inferring method as the chroma TU. In other words, if the cbfs of the first three leaf TUs are all zero, the cbf of the last TU must be 1.

Figure 1:
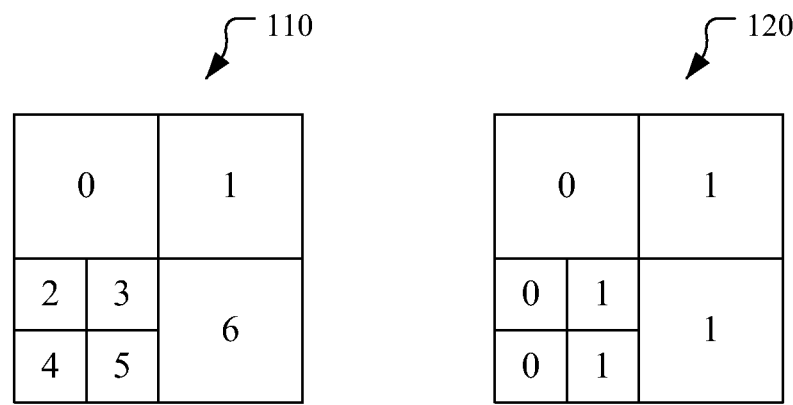
FIG. 1 illustrates an example of the residual quad-tree structure and the coded block flags of the leaf TUs.
Figure 2A:
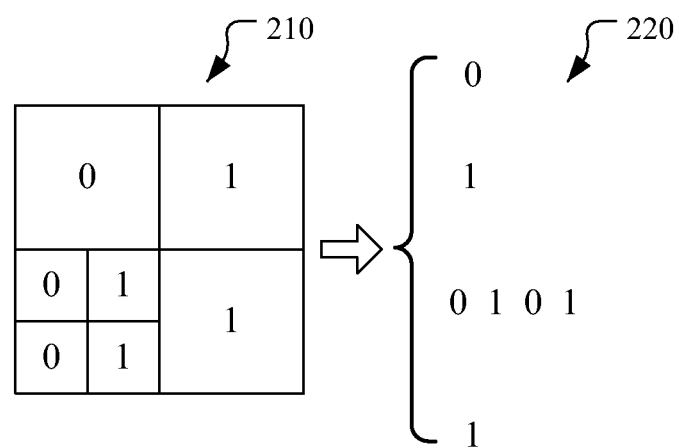
FIG. 2A illustrates an example of coded block flag signaling method for the luma TU according to HM-5.0.
Figure 2B:
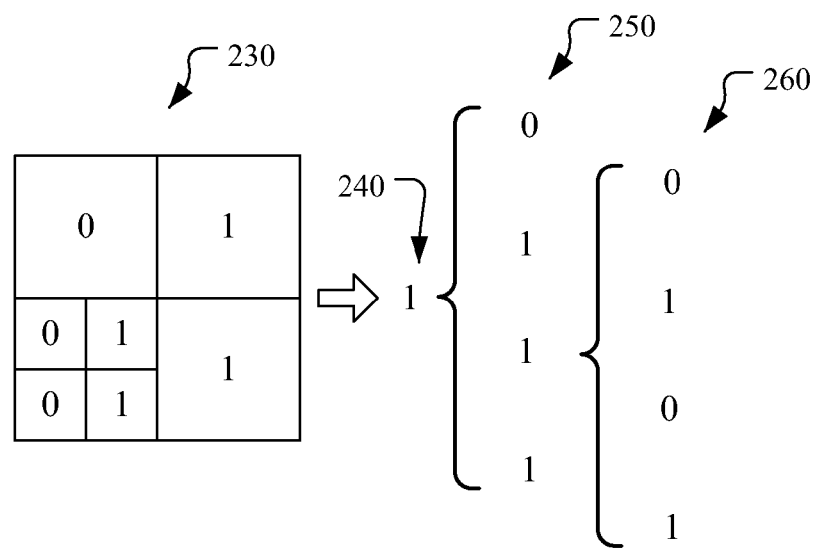
FIG. 2B illustrates an example of coded block flag signaling method for the chroma TU according to HM-5.0.
Figure 3:
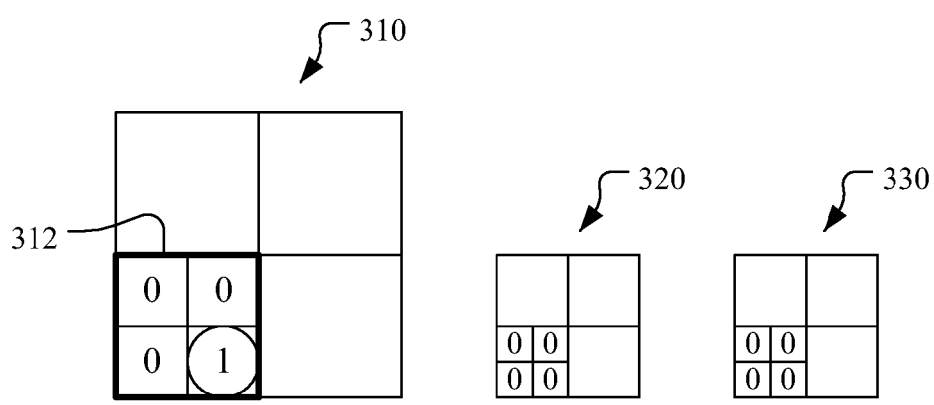
FIG. 3 illustrates an example of coded block flag signaling based on inferring of the luma TUs and chroma TUs.
Figure 4:
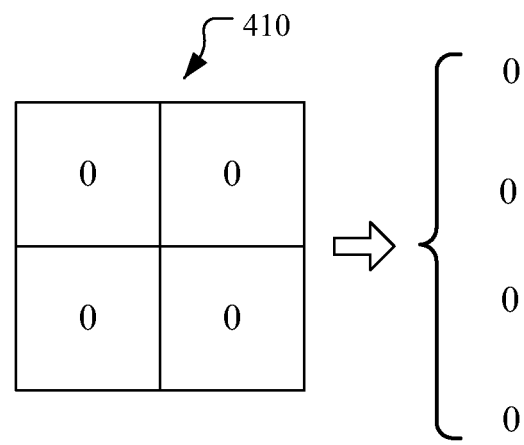
FIG. 4 illustrates an example of coded block flag signaling for the cbfs of four 16×16 chroma root TUs.
Figure 5:
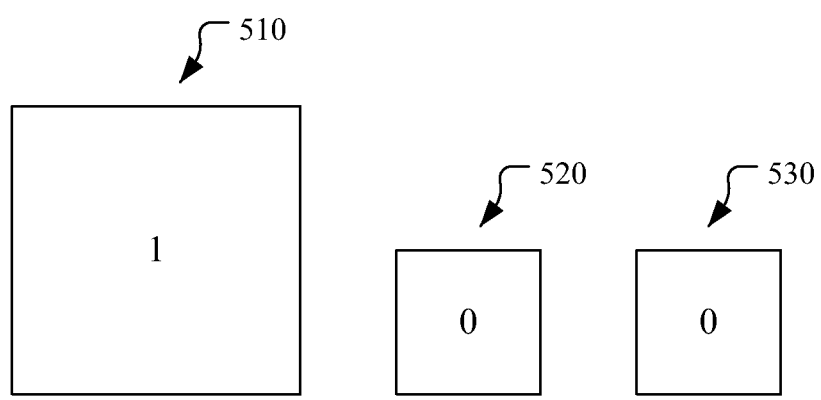
FIG. 5 illustrates an example of coded block flag inferring mechanism for an inter CU according to an embodiment of the present invention.

In another embodiment, the residual flag inferring method for the inter CU is also applied to the unified signaling methods. Therefore, when the residual flag is true and the cbfs for the chroma TUs are all 0, the cbf of the top root luma TU is inferred to be 1 regardless of whether the top root TU is further split or not. Furthermore, this residual flag inferring method for the inter CU can be applied to other TU depths in addition to depth 0. In other words, when the TU is further split and chroma cbfs are all zero, the cbf of the luma TU can be inferred to be 1. As illustrated in FIG. 5, when the residual flag is 1 and the cbfs for chroma (U 520 and V 530) root TUs are all 0, the cbf of the luma root TU 510 can be inferred to be 1.

Furthermore, the context formation of the luma cbf can also be unified with the chroma cbf so that context formation for cbf coding based on CABAC (context-based adaptive binary arithmetic coding) is dependent on the TU depth for both the luma and chroma components. In order to reduce the complexity of entropy coding of cbf flag, the number of contexts can be reduced. Furthermore, bypass coding mode can be used for CABAC-based cbf coding.

Figure 6A:
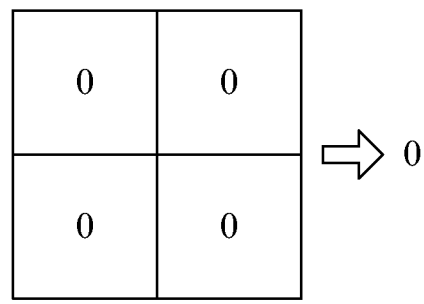
FIG. 6A and FIG. 6B illustrate examples where the cbf of the chroma component is signaled at CU level according to an embodiment of the present invention.
Figure 6B:
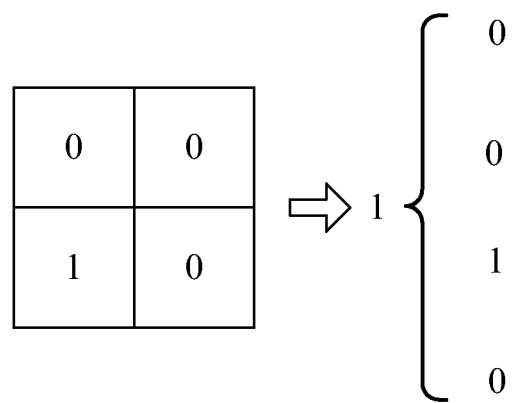

In another embodiment, the root cbf is always signaled at the CU level regardless of the size of the maximum TU. Therefore, there is always a root cbf in each CU. FIG. 6A and FIG. 6B illustrate examples of the cbf coding process when the chroma CU size is 32×32 and the maximum TU size is 16×16. In FIG. 6A, the chroma CU corresponds to a 32×32 block, which is larger than the maximum chroma TU size (i.e., 16×16). The root cbf for the chroma CU is 0 since all the chroma TUs associated with the CU have no non-zero coefficient as indicated by 0. Since a root cbf in each CU is always signaled according to an embodiment of the present invention, a 0 will be signaled for the CU and there is no need for additional cbf signaling. FIG. 6B illustrates another example, where the lower left TU contains at least one non-zero coefficient. In this case, a 1 is signaled for the root chroma CU and additional cbf bits "0 0 1 0" are signaled to indicate which TU contains non-zero coefficients. The maximum TU sizes for the luma and chroma components are known for a coding system based on HM-5.0. The information of the maximum TU size may also be signaled in the bitstream, such as in the sequence level (e.g., SPS) of the bitstream.

In yet another embodiment, luma and chroma cbf signaling methods are unified by extending the luma cbf coding method to the chroma cbf. As a result, the luma and chroma cbf are both signaled only for the leaf TUs.

Figure 7:
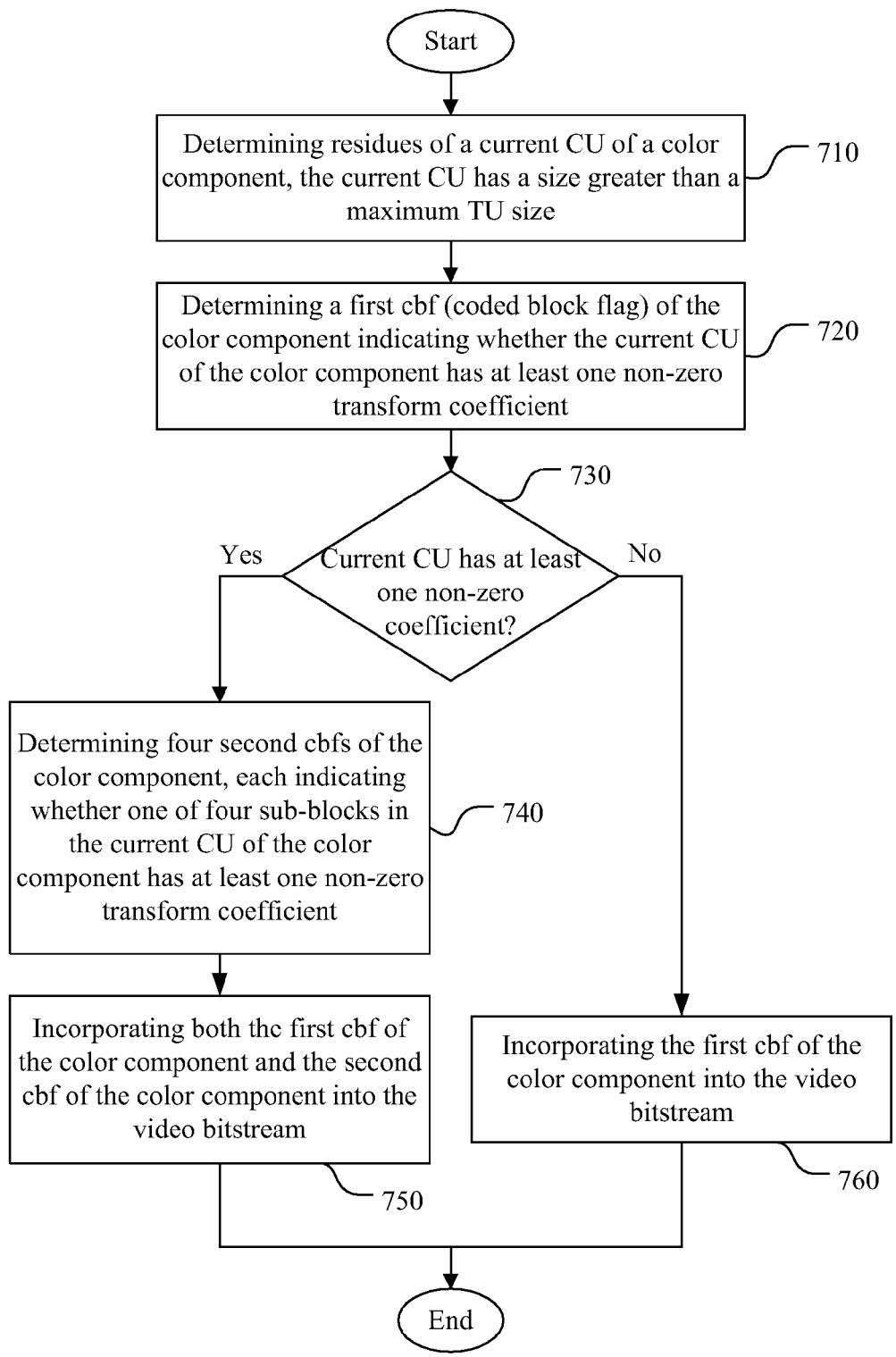
FIG. 7 illustrates an exemplary flowchart of an encoder incorporating an embodiment of the present invention.

The cbf signaling method described above can be used in a video encoder as well as a video decoder. FIG. 7 illustrates an exemplary flowchart of an encoder incorporating an embodiment of the present invention. The residues of a current CU are determined as shown in step 710, where the current CU size is larger than the maximum TU size. A first cbf of a color component indicating whether the current CU (depth=0) has at least one non-zero transform coefficient is determined as shown in step 720. According to the result of the first cbf, different processing routes are taken as shown in step 730. If the current CU of the color component has at least one non-zero transform coefficient, four second cbfs of the color component, each indicating whether one of four sub-blocks (depth=1) of the color component in the current CU has at least one non-zero transform coefficient, are determined as shown in step 740. In this case, both the first cbf and the four second cbfs are incorporated into the video bitstream as shown in step 750. If the current CU has no non-zero transform coefficient, only the first cbf is incorporated into the video bitstream as shown in step 760. The cbf signaling by incorporating the cbf in the video bitstream will allow a decoder to recover the residual quad-tree structure and perform decoding process accordingly. In some embodiments, if at least one of the sub-block of the color component has at least one non-zero transform coefficient and the sub-block does not reach the minimum TU size of the color component, the sub-block(s) with non-zero transform coefficient(s) is further partitioned into four leaf blocks (depth=2). Four third cbfs of the color component, each indicating whether one of the four leaf blocks of the color component has at least one non-zero transform coefficient, are determined for each sub-block with non-zero transform coefficient. The four third cbfs of the color component are also incorporated into the video bitstream. The sub-blocks and leaf blocks may be root TUs and leaf TUs in the current CU. The color component may be luma or chroma component.

Figure 8:
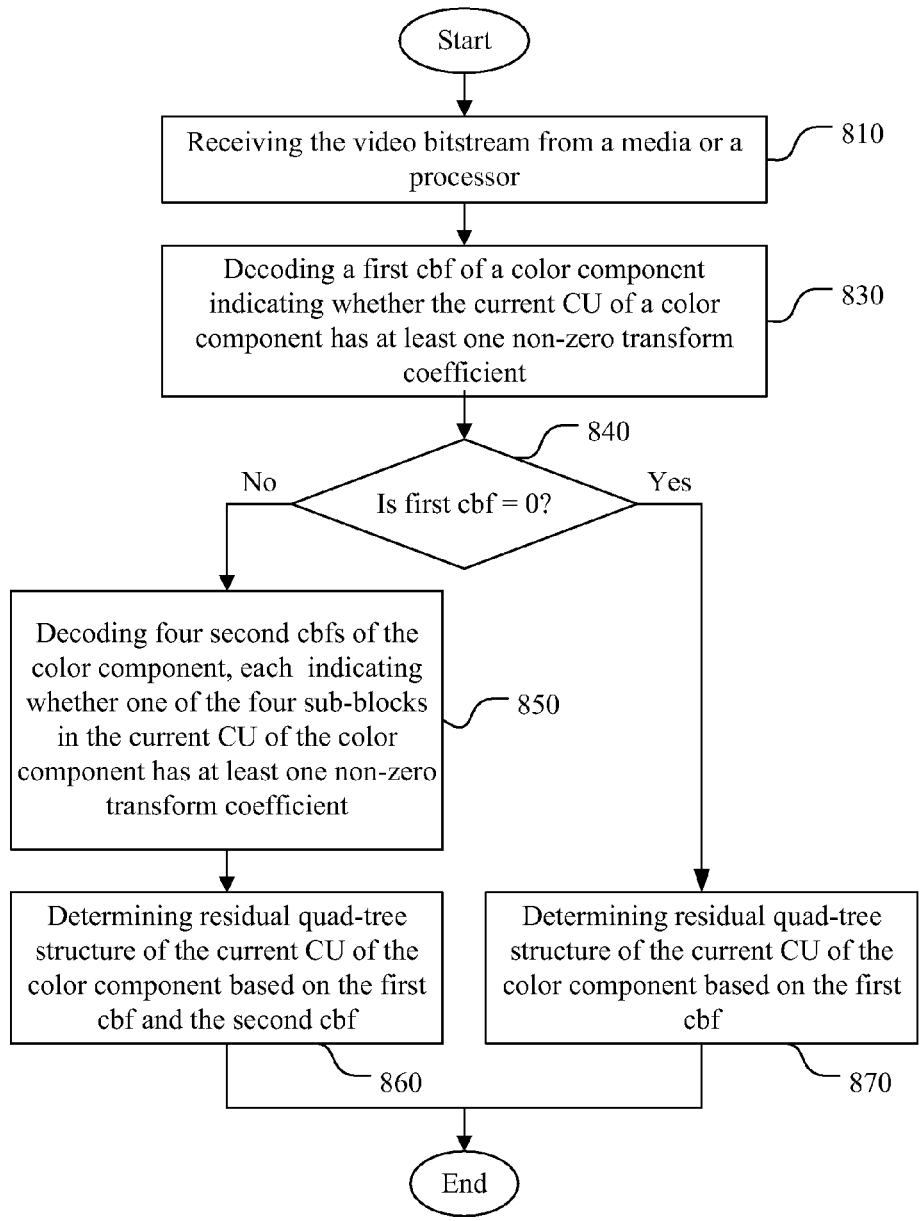
FIG. 8 illustrates an exemplary flowchart of a decoder incorporating an embodiment of the present invention.

FIG. 8 illustrates an exemplary flowchart of a decoder incorporating an embodiment of the present invention. The video bitstream is received from a media or a processor as shown in step 810. The video bitstream may be stored in a media such as a storage media (hard drive, optical disc, or flash card) or computer memory (RAM, PROM, DRAM or flash memory). The video bitstream may also be received and/or processed by a processor. For example, in a broadcast environment, a channel receiver may receive modulated signal, demodulate and de-multiplex to recover a desired bitstream. In this case, the video bitstream is received from a processor (i.e., the channel receiver). In step 830, a first cbf of a color component indicating whether the current CU (depth=0) of the color component has at least one non-zero transform coefficient is decoded. According to the decoding result, different decoding routes are taken as shown in step 840. If the first cbf of the color component is not zero, four second cbfs of the color component, each indicating whether one of four sub-blocks (depth=1) of the color component in the current CU has at least one non-zero transform coefficient, are decoded as shown in step 850. The residual quad-tree structure of the current CU of the color component is then determined based on the first cbf and four second cbfs as shown in step 860. If the four first cbfs of the color component are zero, the residual quad-tree structure of the current CU of the color component is then determined based on the first cbf only as shown in step 870. In some embodiments, four third cbfs of the color component are also decoded if one of the sub-block of the color component at depth=1 has at least one non-zero transform coefficient and the sub-block is larger than the minimum TU size of the color component. Each of the four third cbfs of the color component indicates whether one of four leaf blocks of the color component has at least one non-zero transform coefficient. The sub-blocks and the leaf blocks may be root TUs and leaf TUs in the current CU. The color component may be chroma or luma component.

Figure 9:
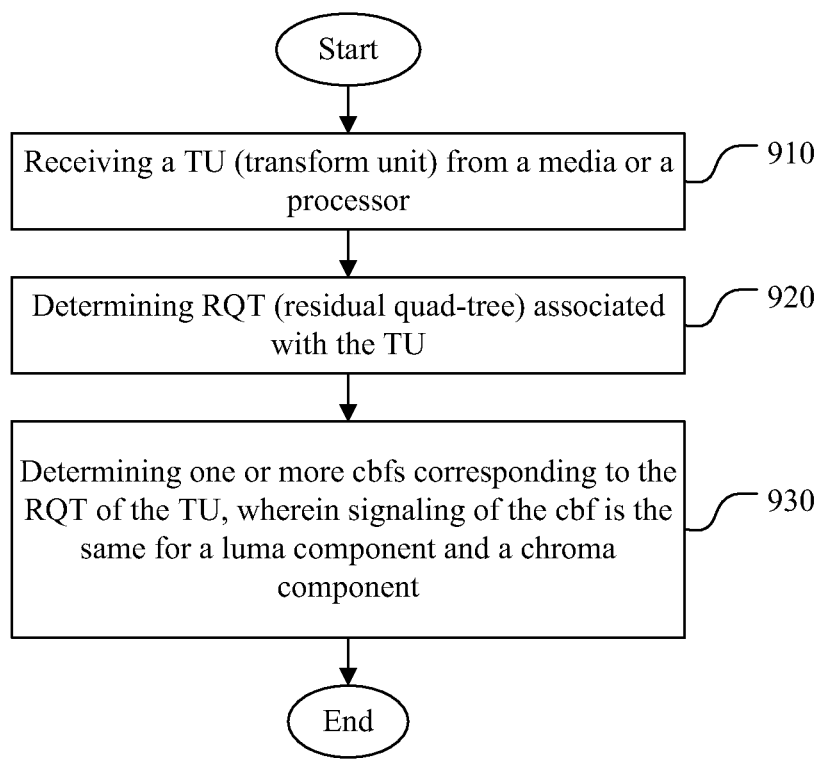
FIG. 9 illustrates an exemplary flowchart of an encoder incorporating another embodiment of the present invention.

FIG. 9 illustrates an exemplary flowchart of an encoder incorporating another embodiment of the present invention. In step 910, a TU is received from a media or a processor. The RQT (residual quad-tree) associated with the TU is then determined as shown in step 920. One or more cbfs corresponding to the RQT of the TU are determined in step 930, wherein signaling of the cbf is the same for the luma component and the chroma component.

Figure 10:
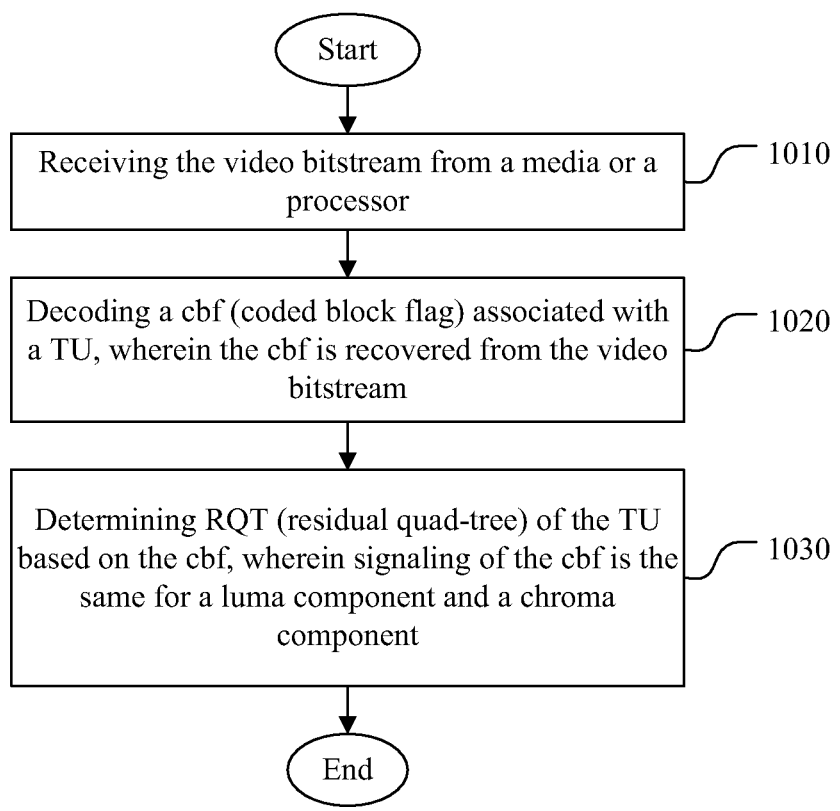
FIG. 10 illustrates an exemplary flowchart of a decoder incorporating another embodiment of the present invention.

FIG. 10 illustrates an exemplary flowchart of a decoder incorporating another embodiment of the present invention. In step 1010, the video bitstream is received from a media or a processor. A cbf associated with a TU is decoded in step 1020, wherein the cbf is recovered from the video bitstream. The residual quad-tree structure of the TU is determined based on the cbf as shown in step 1030, wherein signaling of the cbf is the same for the luma component and the chroma component.

The flowcharts shown above are intended to illustrate examples of cbf signaling for a video encoder and a decoder incorporating embodiments of the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for decoding a video bitstream, the method comprising:
   receiving the video bitstream from a media or a processor;
   decoding a first cbf (coded block flag) of a color component indicating whether a current CU (coding unit) of the color component has at least one non-zero transform coefficient, wherein the first cbf is recovered from the video bitstream, and wherein the first cbf comprises a root cbf;
   based on a decoding result of the first cbf, decoding four second cbfs of the color component, each indicating whether one of four sub-blocks in the current CU of the color component has at least one non-zero transform coefficient, wherein the second cbfs are recovered from the video bitstream, and wherein the four second cbfs comprise leaf cbfs; and
   determining residual quad-tree structure of the current CU of the color component based on the first cbf, or based on the first cbf and the four second cbfs if the second cbfs exist;
   wherein the current CU of the color component has a size greater than a maximum TU size of the color component, and wherein signaling of the root cbf and signaling of the leaf cbfs are applied for both a luma component and a chroma component.

2. The method of claim 1, wherein the maximum TU (transform unit) size of the color component is 32×32 for a luma component and the maximum TU size of the color component is 16×16 for a chroma component.

3. The method of claim 1, wherein the maximum TU size of the color component is signaled in a sequence level.

4. The method of claim 1, further comprising decoding third cbfs of the color component according to decoding result of the second cbfs, wherein each third cbf indicates whether one leaf block of the color component in a next depth of the four sub-blocks has at least one non-zero transform coefficient, and the third cbfs are recovered from the video bitstream; and the residual quad-tree structure of the current CU of the color component is further based on the third cbfs if the third cbfs exist.

5. A method for decoding a video bitstream, the method comprising:
   receiving the video bitstream from a media or a processor;
   decoding a cbf (coded block flag) associated with a TU (transform unit), wherein the cbf is recovered from the video bitstream, and the cbf is for a color component indicating whether the TU of the color component has at least one non-zero transform coefficient, wherein the cbf is coded using CABAC (context-based adaptive binary arithmetic coding), wherein context model for the CABAC depends on depth of the RQT; and
   determining signaling of the cbf, wherein determining RQT (residual quad-tree structure) of the TU based on the cbf, and wherein signaling of the cbf is applied for both a luma component and a chroma component.

6. The method of claim 5, wherein the cbf is signaled at a root TU and leaf TUs.

7. The method of claim 5, wherein the cbf is signaled at leaf TUs and the cbf is not signaled at a root TU.

8. The method of claim 5, wherein the cbf is signaled at a root level of a CU regardless whether block size of the CU is larger than a maximum TU size.

9. The method of claim 5, wherein the context model is simplified and the CABAC includes a bypass mode.

10. The method of claim 5, wherein the cbf is determined using inferring.

11. A method for coding a cbf (coded block flag), the method comprising:
   determining residues of a current CU (coding unit) of a color component;
   determining a first cbf (coded block flag) of the color component indicating whether the current CU of the color component has at least one non-zero transform coefficient, and wherein the first cbf comprises a root cbf;
   if the current CU has at least one non-zero transform coefficient, determining four second cbfs of the color component, each indicating whether one of four sub-blocks in the current CU of the color component has at least one non-zero transform coefficient, and wherein the four second cbfs comprise leaf cbfs; and
   incorporating the first cbf of the color component into a video bitstream, or both the first cbf and the second cbfs of the color component into the video bitstream if the second cbfs exist; and
   wherein the current CU of the color component has a size greater than a maximum TU size of the color component, and wherein signaling of the root cbf and signaling of the leaf cbfs are applied for both a luma component and a chroma component.

12. The method of claim 11, wherein the maximum TU (transform unit) size of the color component is 32.times.32 for a luma component and the maximum TU size of the color component is 16.times.16 for a chroma component.

13. The method of claim 11, wherein the maximum TU size of the color component is incorporated in a sequence level.

14. The method of claim 11, further comprising determining third cbfs of the color component if at least one sub-block has at least one non-zero transform coefficient, wherein each third cbf indicates whether one leaf block of the color component in a next depth of the four sub-blocks has at least one non-zero transform coefficient; and incorporating the first cbf, the second cbfs, and the third cbfs of the color component into the video bitstream if the third cbfs exist.

15. A method for coding a cbf (coded block flag), the method comprising:
   receiving a TU (transform unit) from a media or a processor;
   determining RQT (residual quad-tree) associated with the TU; and
   determining one or more cbfs corresponding to the RQT of the TU, wherein signaling of the one or more cbfs is the same for a luma component and a chroma component, wherein the one or more cbfs are coded using CABAC (context-based adaptive binary arithmetic coding), wherein context model for the CABAC depends on depth of the RQT.

16. The method of claim 15, wherein the cbf is signaled at a root TU and leaf TUs.

17. The method of claim 15, wherein the cbf is signaled at leaf TUs and the cbf is not signaled at a root TU.

18. The method of claim 15, wherein the cbf is signaled at a root level of a CU regardless whether block size of the CU is larger than a maximum TU size.

19. An apparatus for decoding a video bitstream, the apparatus comprising:

at least one circuit configured for:

receiving the video bitstream from a media;

decoding a first cbf (coded block flag) of a color component indicating whether a current CU (coding unit) of the single color component has at least one non-zero transform coefficient, wherein the first cbf of the color component is recovered from the video bitstream, and wherein the first cbf comprises a root cbf;

decoding a second cbf of the color component, each second cbf indicating whether one of four sub-blocks in the current CU of the color component has at least one non-zero transform coefficient, according to decoding result of the first cbf of the color component, wherein the second cbf of the color component is recovered from the video bitstream, and wherein the four second cbfs comprise leaf cbfs; and determining residual quad-tree structure of the current CU of the color component based on the first cbf of the color component, or based on the first cbf and the second cbfs of the color component if the second cbfs exist; and wherein the current CU of the color component has a size greater than a maximum TU size of the color component, and wherein signaling of the root cbf and signaling of the leaf cbfs are applied for both a luma component and a chroma component.

20. An apparatus for coding a cbf (coded block flag), the apparatus comprising:

at least one circuit configured for:

receiving a current CU (coding unit) of a color component from a media or a processor;

determining a first cbf (coded block flag) of the color component indicating whether the current CU has at least one non-zero transform coefficient, and wherein the first cbf comprises a root cbf;

determining four second cbfs of the color component, each indicating whether one of four sub-blocks in the current CU of the color component has at least one non-zero transform coefficient, if the current CU of the color component has at least one non-zero transform coefficient, and wherein the four second cbfs comprise leaf cbfs; and incorporating the first cbf of the color component into a video bitstream, or both the first cbf and the second cbfs of the color component into the video bitstream if the second cbfs exist; and wherein the current CU of the color component has a size greater than a maximum TU size of the color component, and wherein signaling of the root cbf and signaling of the leaf cbfs are applied for both a luma component and a chroma component.

* * * * *